United States Patent
Czerwonatis et al.

(10) Patent No.: US 10,494,548 B2
(45) Date of Patent: Dec. 3, 2019

(54) ADHESIVE TAPE FOR FLYING SPLICE

(71) Applicant: TESA SE, Norderstedt (DE)

(72) Inventors: Niels Czerwonatis, Hamburg (DE); Kerstin Götz, Hamburg (DE); Jens Nootbaar, Hamburg (DE); Marco Walper, Norderstedt (DE)

(73) Assignee: TESA SE, Norderstedt (DE)

( * ) Notice: Subject to any disclaimer, the term of this patent is extended or adjusted under 35 U.S.C. 154(b) by 346 days.

(21) Appl. No.: 15/220,784

(22) Filed: Jul. 27, 2016

(65) Prior Publication Data

US 2018/0030314 A1 Feb. 1, 2018

(30) Foreign Application Priority Data

Jul. 27, 2015 (DE) .................. 10 2015 214 193

(51) Int. Cl.
*C09J 5/00* (2006.01)
*C09J 7/20* (2018.01)
*B65H 19/10* (2006.01)

(52) U.S. Cl.
CPC .............. *C09J 5/00* (2013.01); *B65H 19/102* (2013.01); *C09J 7/201* (2018.01); *B65H 2301/41766* (2013.01); *C09J 2201/128* (2013.01); *C09J 2201/606* (2013.01); *C09J 2203/342* (2013.01); *C09J 2400/283* (2013.01)

(58) Field of Classification Search
CPC ........ C09J 5/00; C09J 7/201; C09J 2203/342; C09J 2400/283; C09J 2201/606; C09J 2201/128; B65H 19/102; B65H 2301/41766; Y10T 428/14; Y10T 428/28
See application file for complete search history.

(56) References Cited

U.S. PATENT DOCUMENTS

| | | |
|---|---|---|
| 5,489,642 A | 2/1996 | Gleichenhagen et al. |
| 5,901,919 A | 5/1999 | Wienberg |
| 5,916,651 A | 6/1999 | Wienberg et al. |
| 6,416,604 B1 | 7/2002 | Nootbaar et al. |
| 6,488,228 B2 | 12/2002 | Davies et al. |
| 6,595,461 B1 | 7/2003 | Storbeck et al. |
| 6,627,023 B1 | 9/2003 | Gleichenhagen et al. |

(Continued)

FOREIGN PATENT DOCUMENTS

| | | |
|---|---|---|
| CA | 2 511 994 A1 | 2/2006 |
| DE | 43 39 309 A1 | 7/1994 |

(Continued)

*Primary Examiner* — Patricia L. Nordmeyer
(74) *Attorney, Agent, or Firm* — Norris McLaughlin P.A.

(57) ABSTRACT

Adhesive tape for the on-the-fly roll changeover of flat web material wound up into rolls, comprising a carrier layer having a first surface and a second surface, a first layer of adhesive on the side of the first surface over at least part of the area, and a second layer of adhesive on one or more areas of the second surface, wherein the adhesive tape has regions suitable for areal splitting, at least those areal regions of the second surface on which the second layer of adhesive is provided being surface coated, the forces of adhesion of the lower layer of adhesive to the surface coating being greater than the forces of adhesion of the surface coating to the carrier layer, and/or the forces of adhesion of the lower layer of adhesive to the surface coating being greater than the forces of cohesion within the surface coating.

13 Claims, 7 Drawing Sheets

(56) References Cited

U.S. PATENT DOCUMENTS

| | | |
|---|---|---|
| 7,067,581 B2 | 6/2006 | Husemann et al. |
| 7,152,825 B2 | 12/2006 | Nootbaar |
| 7,705,080 B2 | 4/2010 | Ellringmann et al. |
| 8,173,252 B2 | 5/2012 | Ellringmann et al. |
| 8,268,442 B2 | 9/2012 | Ellringmann et al. |
| 8,287,973 B2 | 10/2012 | Nagel et al. |
| 8,597,751 B2 | 12/2013 | Götz et al. |
| 8,877,312 B2 | 11/2014 | Wang |
| 8,993,082 B2 | 3/2015 | Götz et al. |
| 9,034,451 B2 | 5/2015 | Nagel et al. |
| 9,339,999 B2 | 5/2016 | Shaw et al. |
| 9,683,140 B2 | 6/2017 | Nagel et al. |
| 2002/0056784 A1 | 5/2002 | Davies et al. |
| 2003/0190445 A1 | 10/2003 | Nootbaar |
| 2004/0192856 A1 | 9/2004 | Nagel et al. |
| 2004/0256515 A1 | 12/2004 | Eikmeier et al. |
| 2004/0260030 A1 | 12/2004 | Husemann et al. |
| 2005/0103429 A1 | 5/2005 | Eikmeier et al. |
| 2007/0128432 A1 | 6/2007 | Eikmeier et al. |
| 2007/0175569 A1 | 8/2007 | Eikmeier et al. |
| 2008/0071044 A1 | 3/2008 | Keite-Telgenbuscher et al. |
| 2008/0081186 A1 | 4/2008 | Ellringmann et al. |
| 2008/0153951 A1 | 6/2008 | Ellringmann et al. |
| 2008/0286533 A1* | 11/2008 | Gotz .................... B65H 19/102 428/192 |
| 2009/0117310 A1 | 5/2009 | Ellringmann et al. |
| 2009/0280323 A1 | 11/2009 | Harder et al. |
| 2009/0294030 A1 | 12/2009 | Nagel et al. |
| 2009/0297833 A1 | 12/2009 | Nagel et al. |
| 2010/0065207 A1 | 3/2010 | Ellringmann et al. |
| 2011/0180224 A1* | 7/2011 | Kozuka ................ D21H 19/36 162/136 |
| 2013/0089690 A1* | 4/2013 | Yao ........................ C09J 7/29 428/41.8 |
| 2013/0112341 A1 | 5/2013 | Nagel et al. |
| 2013/0183473 A1* | 7/2013 | Lanfranconi ........ B31D 1/0062 428/41.8 |
| 2014/0079918 A1 | 3/2014 | Götz et al. |
| 2014/0162008 A1 | 6/2014 | Wang |
| 2015/0030813 A1 | 1/2015 | Shaw et al. |
| 2019/0092981 A1* | 3/2019 | Czerwonatis ........ B65H 19/102 |

FOREIGN PATENT DOCUMENTS

| | | |
|---|---|---|
| DE | 296 21 879 U1 | 2/1997 |
| DE | 195 44 010 A1 | 5/1997 |
| DE | 196 28 317 A1 | 1/1998 |
| DE | 196 32 689 A1 | 2/1998 |
| DE | 199 02 179 A1 | 8/2000 |
| DE | 102 10 192 A1 | 10/2003 |
| DE | 10 2004 040 814 A1 | 3/2006 |
| DE | 601 20 196 T2 | 3/2007 |
| DE | 20 2013 006 227 U1 | 7/2013 |
| DE | 10 2013 009 850 A1 | 6/2014 |
| DE | 10 2013 226 504 A1 | 6/2015 |
| EP | 0 655 490 A2 | 5/1995 |
| EP | 0 970 905 A1 | 1/2000 |
| EP | 1 076 026 A2 | 2/2001 |
| EP | 1 426 480 A1 | 9/2004 |
| EP | 1 489 153 A1 | 12/2004 |
| EP | 1 903 084 A1 | 3/2008 |
| EP | 1 935 956 A2 | 6/2008 |
| EP | 2 116 581 A1 | 11/2009 |
| EP | 2 130 886 A2 | 12/2009 |
| EP | 2 130 887 A2 | 12/2009 |
| EP | 2 166 051 A1 | 3/2010 |
| EP | 1 948 545 B1 | 3/2012 |
| EP | 2 615 049 A1 | 7/2013 |
| EP | 2 062 952 B1 | 1/2016 |
| WO | 03/020623 A1 | 3/2003 |
| WO | 03/024850 A1 | 3/2003 |
| WO | 2007/048695 A1 | 3/2007 |
| WO | 2007/096010 A1 | 8/2007 |

* cited by examiner

ADHESIVE TAPE FOR FLYING SPLICE

This application claims priority of German Patent Application No. 10 2015 214 193.4, filed Jul. 27, 2015, the entire contents of which are incorporated herein by reference.

The invention relates to an adhesive tape for the on-the-fly roll changeover of flat web material wound up into rolls (splicing method, or simply "splice"), having an adhesive facing side and having a main carrier on whose reverse face an adhesive has been provided which in the splice process can be split off from the main carrier, and also to a splicing method for the on-the-fly roll changeover of flat web material wound up into rolls, for which an adhesive tape of this kind is suitable.

Roll changeover on the fly in paper mills or the like is a commonplace method for replacing an old, almost fully unwound flat web roll by a new roll without having to stop the high-speed machinery. It uses double-sided self-adhesive tapes, known as tabs, which on the one hand are highly adhesive and highly tacky, while on the other hand do not cause disruption in the paper machine, by virtue of their water-soluble self-adhesives and paper carriers, when the paper wastes are reused. These tabs are adhered artfully in sawtooth form at the web start, a procedure which requires experienced personnel, with the high-speed machinery leaving generally only little time for the entire operation.

Although this technology is well-established and well-practised, it is not without certain disadvantages. Thus experienced staff are required, the procedure is intrinsically hectic, and the bonds are also relatively thick, since in each case two plies of paper and the adhesive tab in-between are the result: a result which is unwanted in the paper industry, since the high thickness may result in tearing, including at coating blades in paper coating machines.

For this butt splicing during on-the-fly roll changeover there are various products on the market, known as tabs, which in addition to a paper carrier are coated on both sides with a water-soluble self-adhesive. Adhesive tapes of this kind are on the market, for instance, under the name tesafix (tesa SE).

It has been possible to improve splice preparation and splice implementation through the use of specific adhesive tapes which on the one hand are suitable for guaranteeing, for the preparation, a roll end bond which does not unintentionally open again even when the rolls are being accelerated to their process speed, these specific adhesive tapes nevertheless having a flat predetermined breakage point such that the end bond opens at exactly the moment, or immediately thereafter, when the new roll is being adhered to the old, outgoing web by means of this very adhesive tape, so that the new flat web is integrated into the process together with the old, outgoing flat web to which it is now bonded, thereby ensuring the continuity of the process.

Adhesive tapes of this kind are, for instance, those which are equipped on the reverse face of their main carrier with multilayer splitting systems comprising a splittable paper carrier, these tapes being described for example in specifications DE 196 28 317 A and DE 199 02 179 A.

Flying splices of this kind are made in the production or processing of other flat web materials, such as films and the like, for example, and in some cases further-adapted adhesive tapes are used there.

As a result of the specific construction of such specialty adhesive tapes, having a plurality of functional layers, adhesive tapes of these kinds are relatively thick. As a consequence of this, the thickness of the bond site of the two webs to one another is relatively large; where otherwise a flat web is guided through the apparatus, the sequence in the region of the bond site is a sequence of at least two flat webs with the web-connecting adhesive tape arranged between them. The thickness of commercial adhesive tapes for continuous bonding, in the region of the splitting system (i.e. the predetermined breakage point), is customarily about 100 to 200 μm in the split state. Added to this are the paper thicknesses at the bond site, which may also be in the range of several 10s to several 100s of μm. This produces the substantial thickness of the paper web assembly in the splicing operation, since it is this point, in the course of travel in processing machinery, that makes first contact with coating assemblies, printing rolls or the like, and here the shape and thickness of the splice poses a particular risk of tearing. The aim is therefore to use extremely thin adhesive splicing tapes. One solution for an adhesive tape of this kind is proposed in DE 102 10 192 A, where an adhesive tape is used that comprises a main paper carrier, an adhesive on the facing side, and a thin stripe of adhesive (instead of a multilayer splitting system) on the reverse. Splitting during the splicing operation in this case is realised by the main carrier being splittable at least in the region of the underlying stripe of adhesive, and by a corresponding portion of the paper being torn out from the main carrier during splicing.

Also part of the prior art is an adhesive tape wherein a paper carrier is coated on both sides with a water-soluble self-adhesive and where the paper carrier consists of an areally splittable paper. This adhesive tape is described in DE 196 32 689 A1. A paper carrier is disclosed which splits in full width. With this mode of functioning, there is a dramatic reduction in the maximum tensile force of the split paper and hence in the maximum possible web tension to be transmitted. In the case of centrally split papers, it is reduced by at least 50%. Where the splitting plane is not central, the maximum tensile force may even be reduced by well below 50%.

A feature shared by both aforementioned solutions is that the splitting of paper carriers produces surfaces which are not very smooth and which, moreover, possess a fibrous-frayed structure. Fibrous and frayed structures of this kind are a disadvantage during coating or in the print works, for example, since fibres may be deposited in the printing mechanism and lead ultimately to incorrect printing, and/or even at the coating unit in the paper mill, there may be deposits beneath the coating assembly. A possible consequence of such deposits is that the coating is irregular and faulty, producing a coating profile that is not clean and uniform. This leads to quality detractions in the product.

It is an object of the invention to provide an adhesive tape for flying splice that produces as small as possible a thickness in the region of the bond between the old and new webs, while nevertheless retaining the full maximum tensile force to accommodate the maximum web tension, and leading to extremely smooth surfaces of the remnants of the predetermined breakage point after splitting.

The object has surprisingly been achieved by the invention as described hereinbelow.

BRIEF DESCRIPTION OF THE DRAWINGS

The invention will now be described in greater detail with reference to the drawings, wherein.

Figure 1:
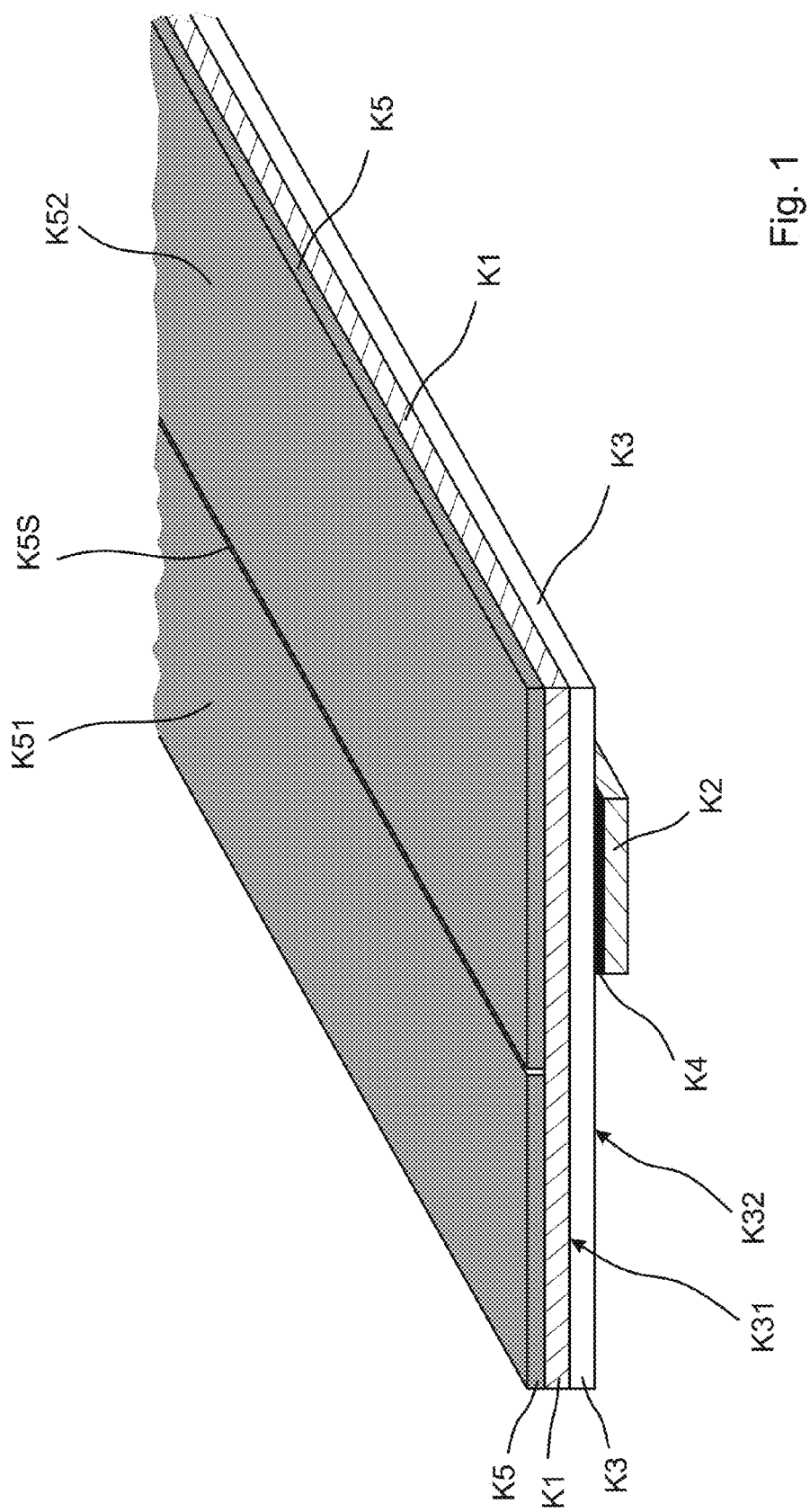
FIG. 1 is a perspective view of an exemplary adhesive tape according to the present invention.

The invention relates accordingly to an adhesive tape K, suitable for on-the-fly roll changeover of flat web material wound up into rolls, which comprises a carrier layer (K3) having a first surface (K31) and a second surface (K32), there being provided on the side of the first surface (K31) of the carrier layer, indirectly or directly, over at least part of the area, a first layer (K1) of adhesive, and the second surface (K32) of the carrier layer having one or more areas on which a second layer (K2) of adhesive is provided. The adhesive tape is characterized in accordance with the invention in that it has regions ("predetermined breakage areas") suitable for areal splitting, which come about as a result of the fact that at least the areal regions of the second surface of the carrier layer on which the second layer of adhesive is provided have been modified with a surface coating (K4), the forces of adhesion of the second layer (K2) of adhesive to the surface coating (K4) are greater than the forces of adhesion of the surface coating (K4) to the carrier layer (K3), and/or the forces of adhesion of the second layer (K2) of adhesive to the surface coating (K4) are greater than the forces of cohesion within the surface coating (K4). In this regard compare FIGS. 1 (perspective view of an exemplary adhesive tape of the invention), 2 (cross section of an exemplary adhesive tape of the invention with surface coating over part of the area), and 3 (cross section of an exemplary adhesive tape of the invention with surface coating over the full area).

With the adhesive tape of the invention, the first and second layers of adhesive are in each case external layers of adhesive, in other words, in particular, layers of adhesive which are able during the application to bring about bonding to a respective substrate surface—in the context of application in the method of flying roll changeover, in particular, a bond to a respective flat web. Their designation as external layers of adhesive is not intended to rule out the possibility of the first layer of adhesive and/or the second layer of adhesive being lined before the application—in particular for better handling and/or storage and/or for protection of the open areas of adhesive—in each case with a release liner. The release liner is then in each case removed before the open area of adhesive is needed for the application.

Material used for the release liner here may be all materials with separation effect that are known per se for this purpose; these materials are, more particularly, antiadhesive materials or antiadhesively coated (more particularly siliconized) materials, such as for example (optionally also modified) silicones, siliconized papers, glassine papers, coated or uncoated HDPE liners (low-pressure polyethylene), coated or uncoated LDPE liners (high-pressure polyethylene), coated or uncoated MOPP and BOPP liners (monoaxially and biaxially oriented polypropylene, respectively), coated or uncoated PET liners (polyethylene terephthalate) and the like.

The first layer of adhesive may be part of a multilayer assembly or may be anchored directly on the first surface of the carrier layer. Hence between the carrier layer of the adhesive tape and the first layer of adhesive there may also, for example, be a layer present which makes the adhesive tape recognisable to optical, inductive, electronic or other detector systems.

The second layer of adhesive may be anchored directly on the surface coating of the carrier layer of the adhesive tape, or may be part of a layer assembly which nevertheless in turn, in particular, does not contain its own carrier layer. Such an assembly may consist, for example, of two adhesive layers, or, for example, of the second layer of adhesive and of a functional layer which brings about improved anchorage on the surface coating of the carrier layer of the adhesive tape.

Carrier layers for the purposes of the present invention are layers which are not layers of adhesive, and which, moreover, are of self-supporting (inherently stable) design; more particularly they are layers of which, therefore, an essential function is to impart (additional) stability to a layer of adhesive or to an assembly of layers of adhesive. Carrier layers may consist in particular of paper, thin films (plastics, metals), textile materials, multilayer laminates and the like.

Functional layers for the purposes of this specification are those layers or coatings on other layers which themselves do not represent a self-supporting assembly but which instead preserve their layer-like cohesion in particular only in conjunction with other layers; this may involve, for example, primer layers, paper coats, coating layers, thin metallizations (available for instance through sputtering processes), corresponding layers of chemical substances applied from solution, suspension or the like and dried, and similar.

The surface coating of the carrier layer of the adhesive tape consists at least of a functional layer, although there may also be an assembly of two or more functional layers. The breakage of the predetermined breakage point in the as-intended application of the adhesive tape is brought about by the following occurring in the regions in which the second layer of adhesive is provided:

the surface coating detaches from the carrier layer, and/or the surface coating splits areally as a result of cohesive fracture within one of its layers, and/or at least one of the functional layers of the surface coating detaches from a second functional layer of the surface coating and hence areal splitting is brought about. Here the adhesive tape of the invention is designed in particular such that all the forces which do not bring about fracture in the sense of at least one of the observations above—in other words, in particular, the forces which cause the other layers to cohere with one another and which bring about the internal cohesion of the layers which do not suffer cohesive fracture—are greater than the forces which produce fracture (in other words: the stability of the adhesive tape ought everywhere to be higher than at the predetermined breakage point).

In all cases there remains at least a part-layer of the surface coating of the carrier layer of the adhesive tape on the detached second layer of adhesive, and so this layer is non-adhesively masked. This has the effect in particular of preventing instances of adhesion if this region makes contact with web material or machine surfaces, and hence of avoiding web tearing.

Flying splices can be performed in particular such that first of all the roll (R) of a new flat web (RB) is provided, by the flat web section (R1) forming the uppermost turn of the new flat web roll (R) being fastened to the flat web section (R2) that forms the second turn, using an adhesive tape (K) of the invention.

Figure 4:
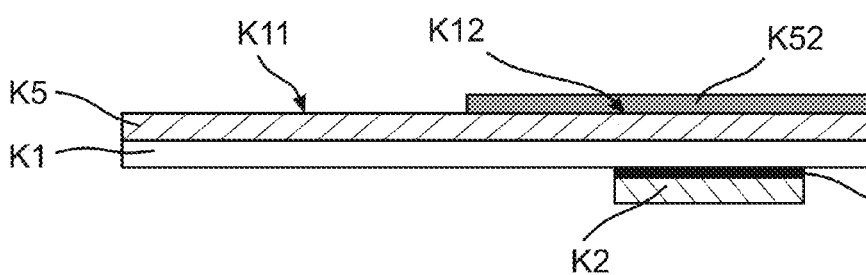
FIG. 4 is a side view of an exemplary adhesive tape according to the present invention.
Figure 6:
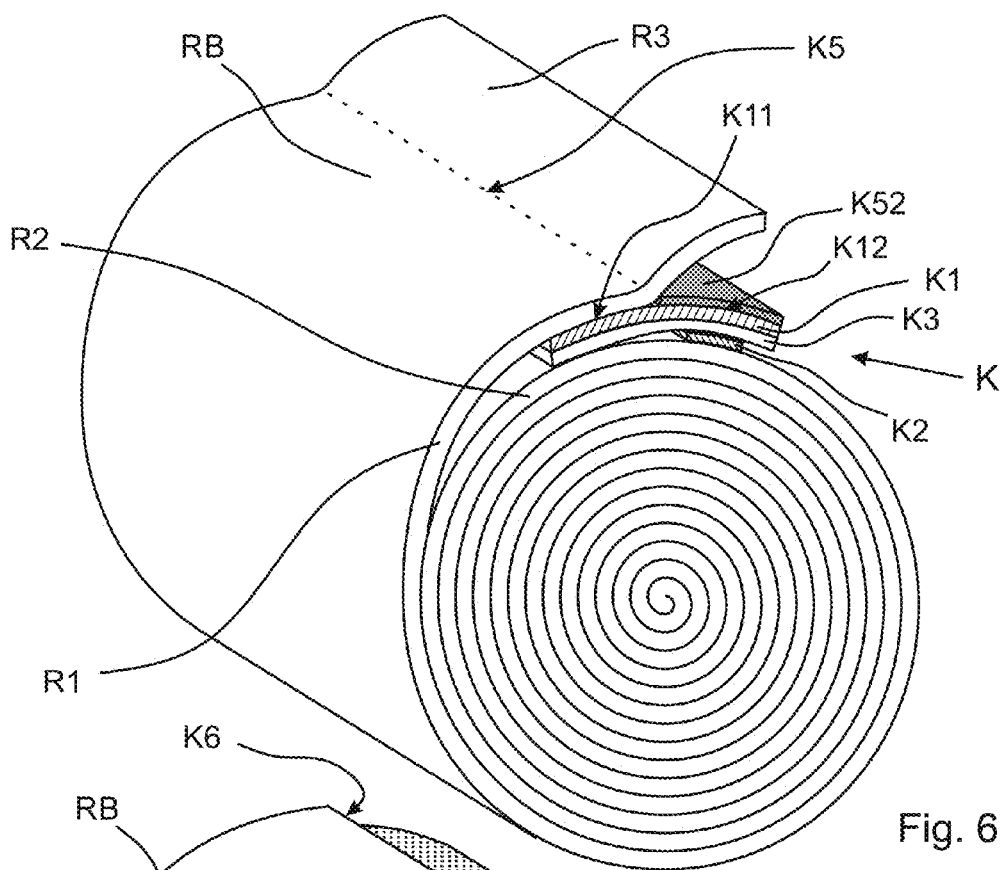
FIG. 6 is a perspective view of a step of a method according to the present invention.

For this purpose the first layer (K1) of adhesive of the adhesive tape of the invention is only partially exposed. This may be accomplished by a release liner (K5) located thereon having a slit or a perforation (K5S) in the longitudinal direction, so that the release liner is divided into two parts (K51, K52), or having a predetermined breakage point to produce two parts (K51, K52), and then only one part of the release liner (K51) being removed, to leave an adhesive region (K11) of the first adhesive (K1) and a non-adhesive region (K12) thereof—non-adhesive because it is lined—extending in each case in the longitudinal direction of the adhesive tape (K) (in this regard cf. FIG. 4). This adhesive tape is then utilised to bond the flat web section of a new roll forming the uppermost turn (R1)—the topmost flat web ply—on the flat web section forming the second-from-topmost turn (R2)—the second flat web ply—of a new roll (R), for instance by, first, the free region of the first layer (K1) of adhesive being bonded in a straight line beneath the end region of the new flat web (RB) and, secondly, the second layer (K2) of adhesive being bonded to the underlying flat web section (R2). The result of this procedure is shown in FIG. 6.

Figure 7:
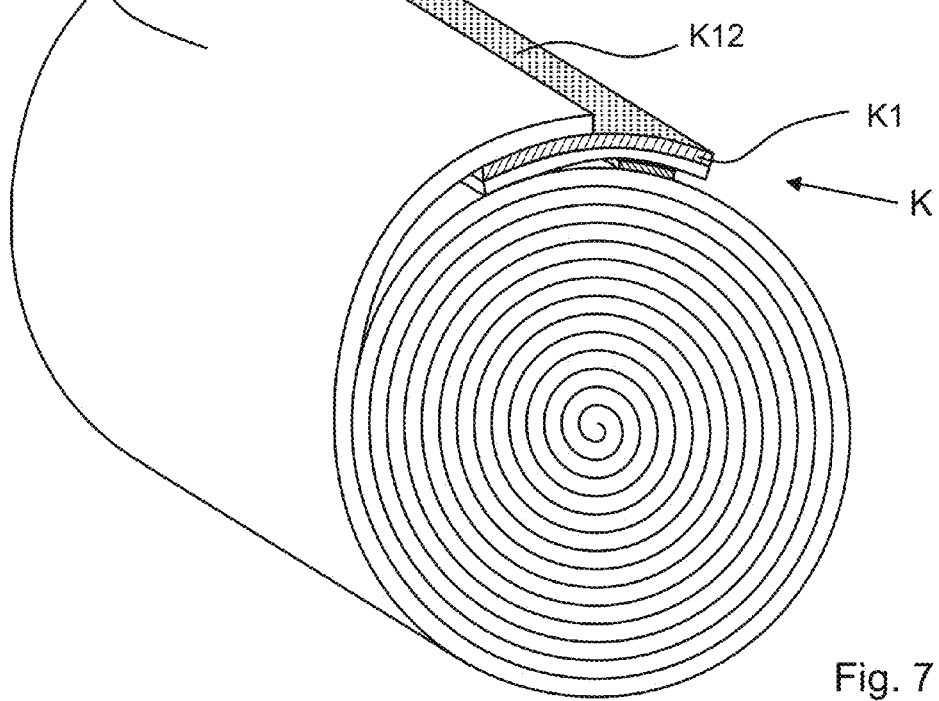
FIG. 7 is a perspective view of a step of a method according to the present invention.

The projecting pennant (R3) of the flat web section (R1) bonded to the first layer (K1) of adhesive is then advantageously removed to length—cut off, torn off or the like—essentially at the edge (K5) to the region (K12) of the first layer (K1) of adhesive that is masked by the remaining part of the release liner (K52), so that the end (K6) of the flat web that then results is essentially adjacent to the remaining release liner (K52) of the first layer (K1) of adhesive of the adhesive splicing tape (K). The part (K52) of the release liner that is still present can then be removed, to give an exposed adhesive surface (K12), which can be utilised for bonding with the outgoing, old flat web (B) (for the result of this procedure, cf. the representation of a roll thus prepared in FIG. 7). Therefore, in the context of this specification, the first layer of adhesive is also termed the front-face layer of adhesive.

Figure 8:
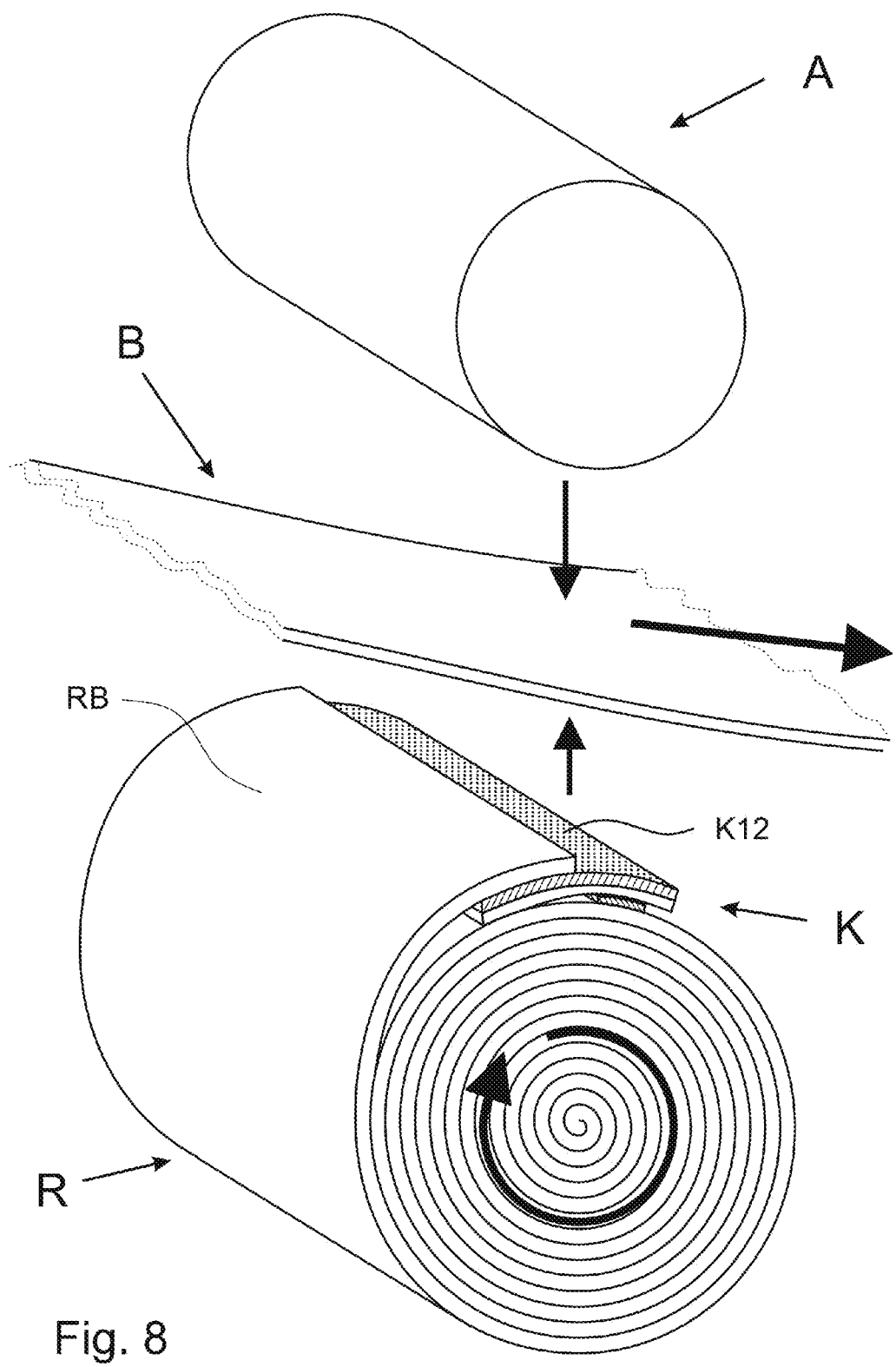
FIG. 8 is a perspective view of a step of a method according to the present invention.

The next step in the splicing process is shown by FIG. 8. The roll (R) thus prepared is then placed adjacent to an almost fully unwound, old roll that requires replacement (not shown in the figures) and is accelerated to substantially the same peripheral speed as said roll. Thereupon it is pressed against the old flat web (B) (for example with the aid of a pressure-application cylinder (A)), with the exposed areal region (K12) of the front-face layer (K1) of adhesive of the adhesive tape (K) bonding to the old web (B) with the webs at substantially identical speeds.

Figure 9:
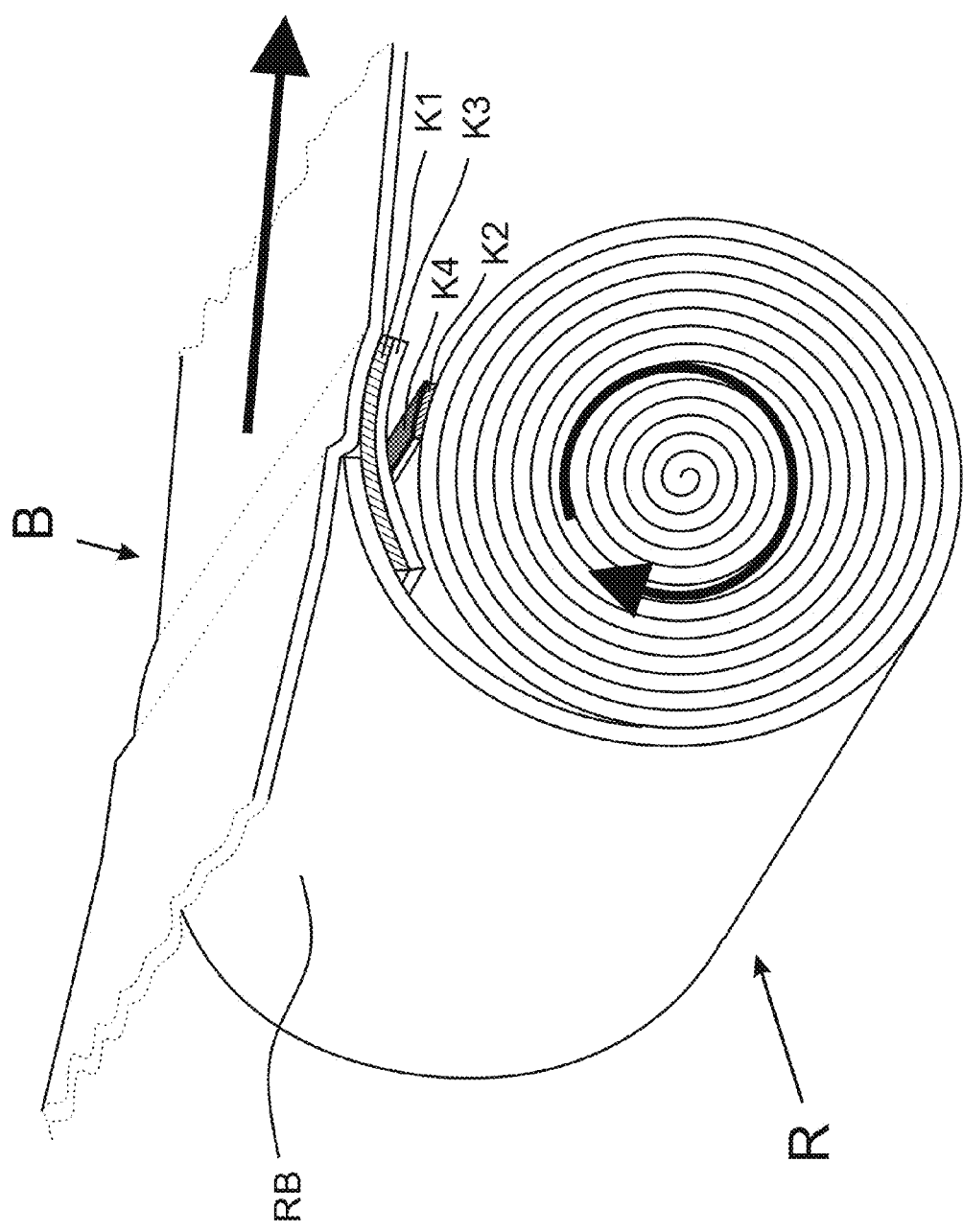
FIG. 9 is a perspective view of a step of a method according to the present invention.
Figure 10:
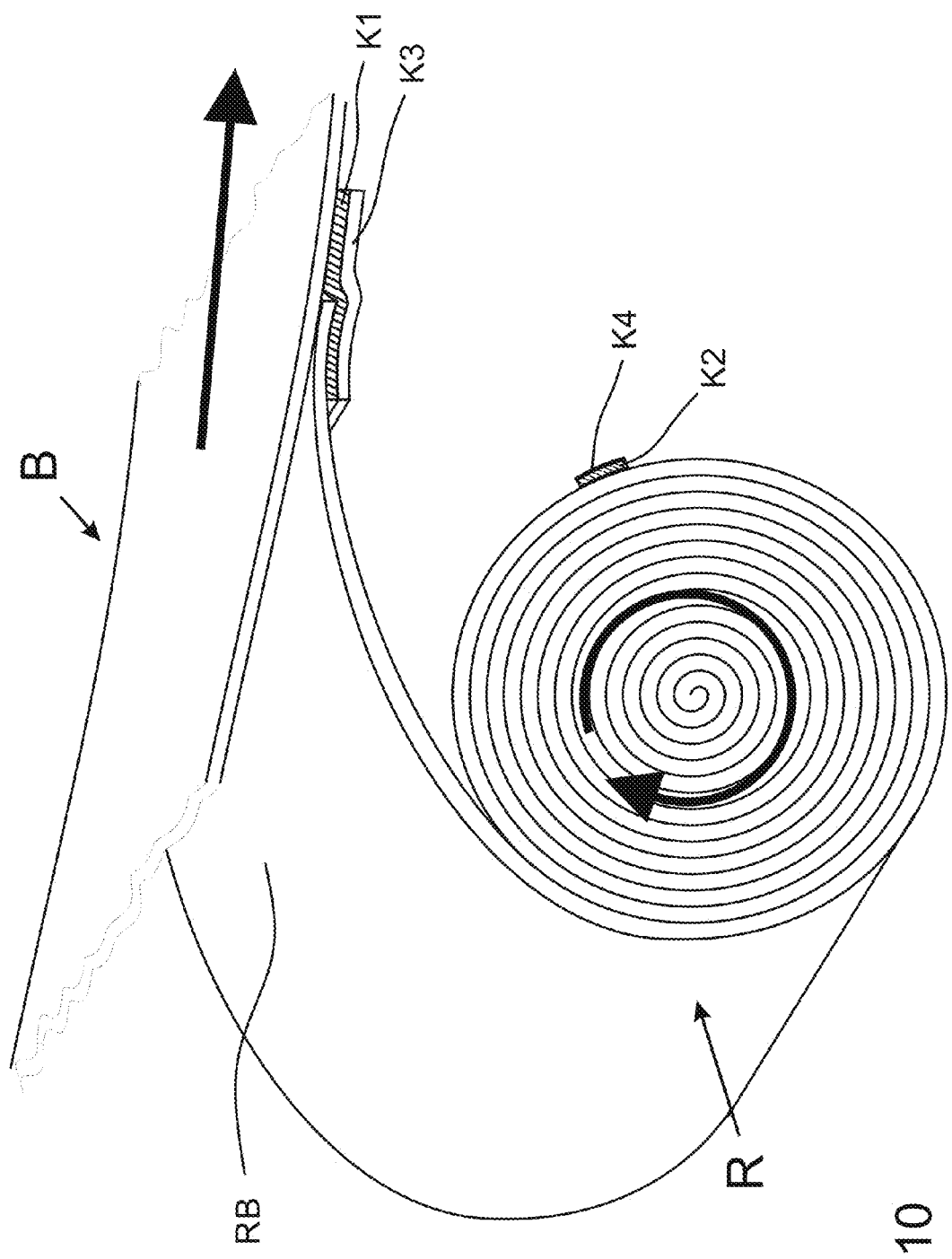
FIG. 10 is a perspective view of a step of a method according to the present invention.

At the same time as or immediately after the bonding to the old web (B), the adhesive tape (K) opens the fastening of the uppermost (R1) ply to the second (R2) ply of the new roll (R) by means of suitable predetermined breakage areas within the adhesive tape (K) (cf. FIG. 9), so that the new web (RB) can be integrated into the process with the old web (B) to which it is adhered (cf. FIG. 10). This ensures a continuous process sequence.

The use of the specific embodiments shown in the figures, and also of the reference symbols used, is done only by way of example for the method of the invention, for illustrative purposes, and is not intended to confine the invention to these embodiments.

The adhesive tape of the invention is particularly suitable for such a process. If a flying splice is carried out with the adhesive tape of the invention, then during the process an areal splitting can be brought about, by the second layer of adhesive, in the regions in which the surface coating is located between said layer and the second carrier surface, either detaching the connection of the latter to the second surface of the carrier layer and hence splitting it from it—by an adhesive fracture—or else by doing so in the regions in which there is an areal splitting within the surface coating between the second layer of adhesive and the second carrier surface—through a cohesive fracture and/or adhesive fracture between individual functional layers of the surface coating—, so that a residual layer of the surface coating is left in connection with the carrier surface, and another residual layer of the surface coating is left on the second layer of adhesive.

In both cases at least a part-layer of the surface coating masks the adhesive tape bonded to the new web, and consequently no adhesive regions are left exposed there (in FIG. 9, reference symbol K4).

The predetermined breakage point ought advantageously to exhibit the weakest cohesion forces of the adhesive splice intended for the invention, so that on opening, during the splicing operation, the adhesive tape breaks at exactly this point (i.e., in the sense of the abovementioned adhesive fracture between the surface coating and the carrier layer, or in the sense of the abovementioned cohesive fracture within the surface coating). As already defined, the anchorage of the second self-adhesive on the surface coating (directly or by means of further layers of adhesive and/or functional layers that may be located there) ought at least to be stronger than the weaker of the two aforementioned cohesion forces, as dictated by the force conditions defined in accordance with the invention (see main claim). Advantageously, however, all other cohesion forces between and within the individual layers that form the adhesive tape—that is, the forces of adhesion between the other layer surfaces, such as in particular the forces of adhesion between the first surface of the carrier and the first layer of self-adhesive (directly or through further layers that may be present there), and the forces of cohesion within the other layers—ought to be greater than those forces—the forces of adhesion of the surface coating to the carrier layer, and the forces of cohesion within the surface coating—which lead to the splitting of the predetermined breakage area, so that there is no unwanted splitting at a location other than the predetermined breakage area.

The adhesive tape of the invention can be given a very thin design. What is enabled by the adhesive tape of the invention in particular is that the bond site and/or the remnant that remains on the new web after splitting can be made thinner than is the case with the systems currently on the market. As a result there is a significant minimization of the risk of unintended operational dropouts—such as web tears, for example.

Especially advantageous is an adhesive tape wherein, apart from the carrier layer defined in accordance with the invention, the first and second layers of adhesive and the surface coating, there are no further layers of adhesive or carrier layers; optionally there may be—just a few µm thick—functional layers, such as pigment layers and/or anchorage layers (such as primer systems, for instance) or, for example, metal foil layers.

Since the main carrier is not damaged, moreover, the maximum tensile forces are not reduced (as would be the case with the adhesive tapes of DE 102 10 192 A and of DE 196 32 689 A), and there are no uneven surfaces, as a result, for instance, of extracted paper fibres (which would likewise be a problem with the adhesive tapes of the two aforementioned specifications).

Construction of the Adhesive Tape of the Invention

The adhesive tape of the invention is described by way of example, for elucidatory purposes, using FIGS. 1 to 4, without any intention that the choice of the specific embodiments and reference symbols used should confine the invention to these embodiments.

The adhesive tape (K) of the invention has a main carrier (K3) and a first layer (K1) of adhesive provided directly or indirectly on a first surface (K31) of the main carrier (K3) (referred to as facing side, owing to the positioning of the adhesive tape on application in the splicing operation). Directly in this context means that the first layer (K1) of adhesive lies immediately on the carrier material (K3). Indirectly means that between the carrier layer (K3) and the first layer (K1) of adhesive there may be one or more further layers provided, such as, for example, functional layers—for instance, layers suitable for detection of the adhesive tape by corresponding detectors provided in the splicing operation, such as paint layers, metal layers (e.g. aluminium layers) or other layers comprising functional additives (such as dyes, metal powders, getters, etc.)—, further layers of adhesive, film layers, layers of textile materials, layers for promoting adhesion between the carrier surface and the first layer of adhesive (such as primer layers, for example) and the like.

Figure 2:
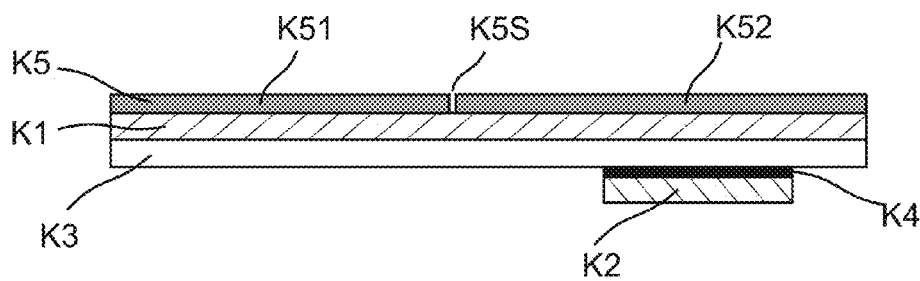
FIG. 2 is a side view of an exemplary adhesive tape according to the present invention.
Figure 3:
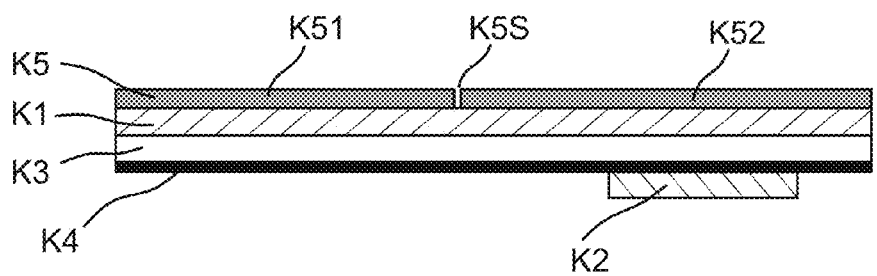
FIG. 3 is a side view of an exemplary adhesive tape according to the present invention.

FIGS. 1 and 2 show, by way of example, variant embodiments with a surface coating (K4) which is confined to the region of the second layer (K2) of adhesive; FIG. 3 shows by way of example a surface coating (K4) provided over the full area on the carrier layer (K3).

Since the splitting of the adhesive splicing tape occurs in the surface coating of the carrier layer or between the surface coating and the carrier layer, but not within the carrier layer, as is frequently the case with prior-art adhesive tapes, there is fundamentally no restriction on the choice of material for the carrier layer. The only requirement is that the carrier layer can be provided with a surface coating which either has sufficiently low forces of adhesion to the carrier surface or has sufficiently low internal forces of cohesion so that the adhesion of the second layer of self-adhesive to this surface coating is higher than at least one of the aforementioned forces.

Hence the carrier layer, for example, can be optimized in terms of stability for the tensile forces to be accommodated. Having emerged as being particularly advantageous are carrier materials whose maximum tensile force—that is, the tensile force which they can withstand at maximum before they tear—in the direction which corresponds to the application direction in the completed adhesive tape product (in general the transverse direction of the adhesive tape), is at least 10 N/cm, lying more particularly in the range between 10 and 100 N/cm. The values are based on the measurement according to DIN EN 14410 (DIN EN 14410:2003), variant A, clamped length 100 mm, speed 300 mm/min, samples 200 mm×15 mm, reported measurement values standardized to 10 mm (1 cm) sample width.

Carrier layers which can be used are in principle papers, films—made from plastics, for example—, nonwovens, multi-layer laminates—composed, for example, of a plurality of papers or a plurality of film materials, or paper(s) and film(s). Laminates of at least one layer of a customary carrier layer material—such as paper and/or plastic—with a metal foil layer (such as aluminium, in particular) may likewise be used with advantage.

In one very preferred procedure, the carrier layer is a paper layer. As surface coating, the surface of the paper may carry an applied layer of a chemical substance, as for example a binder.

The chemical substance may be applied, for example, in the form of a solution or dispersion and thereafter dried, to give a dry layer (for example, continuous film or porous coating) lying on the carrier surface. By selecting the nature of application, the chemical substance and the concentration of the solution, suspension or dispersion, it is possible to influence the adhesion of the film to the carrier surface.

It is also possible for the solution, suspension or dispersion to penetrate into the surface of the carrier layer. This may be of interest in particular for the embodiments where the predetermined breakage point is present within the surface coating and this coating splits by cohesive fracture in the splicing method, though it is not limited to this.

In one very preferred variant embodiment of the invention, a coated paper is used as carrier layer, or a carrier layer of that kind which has a coated paper on one surface is used.

In order to obtain a coherent surface and better printability, it is common to carry out uniform application of a coating composition (also called a coating slip) to papers—such as coating base papers, for instance—by means, for instance, of knife coating, roll coating, brush coating, jet coating (for example air jet coating) or, for example, by curtain coating. The surface coating thus obtained is also referred to as a "coating", and the treated paper as "coated paper". Papers may be coated on one or both sides.

Coating slips used in accordance with the invention are customarily composed of a plurality of the following principal constituents: water, pigments (generally white mineral pigments or white minerals), dispersants for pigments (generally polyacrylates), binders (generally synthetic acrylate or styrene-butadiene copolymers), starch, thickeners (generally methylcellulose derivatives or acrylate copolymers), additives for regulating the viscosity and the water retention, calendering aids (e.g. waxes), release agents (for example polyvinyl alcohol), auxiliaries for reducing the wet abrasion, shading dyes (for example optical brighteners), antifoams, biocides.

The solids fraction in a coating slip is customarily about 65 to 70 wt %, almost 90% of which is pigments. The binder fraction is customarily 10 to 15 wt % (based on dry matter), and via the binder fraction it is possible in particular to influence those properties that are relevant for the process of splitting at the predetermined breakage point (such as, for example, the tendency towards adhesive or cohesive separation, etc.). All other additives are customarily added in small concentrations (more particularly below 1 wt %). The selection of the pigments for commercially available papers is guided by the quality requirements imposed on the coated papers, for example whiteness, opacity, smoothness, gloss, pick resistance, printability.

Material used for the coating composition in accordance with the invention, with particular advantage, is a chemical composition whose principal constituent comprises one or more minerals—such as, for example, chalk (calcium carbonate), talc, kaolinite earth (kaolin, china clay for example)—, one or more protein derivatives—such as for example casein—, one or more polysaccharides—such as for example starch—, one or more plastics particles, or a mixture of two or more representatives of the aforementioned substances. Additionally or instead, moreover, it is possible for specialty pigments to be used, such as satin white (calcium aluminate sulphate) or calcined clays.

As constituent of the chemical composition for the coating material it is possible in particular to select at least partly, preferably as principal constituent, in other words to an extent of more than 50%, more preferably also exclusively, components which are present in leaflet-like and/or layer-like form. This may be realised in particular advantageously by selection of appropriate minerals. Leaflet- and/or layer-like substances, especially minerals, have a structure such that the interactions between the building blocks are not comparable in all dimensions, but instead within a plane (layer) are greater than between the planes (definition according to Römpp). The different interaction is manifested in different atomic distances and results in a usually leaflike splittability. Known examples of such compounds are graphite, montmorillonite and mica. The slideable layers, which are either planar, as in graphite, or corrugated, as in phyllosilicates, can be easily displaced parallel relative to one another. The choice of leaflet-like and/or layer-like constituents of the coating material may be utilised for particularly good regulation of the splittability in the sense of the inventive teaching.

Employed with particular advantage are coating compositions based on kaolin, especially in leaflet form, and/or based on titanium dioxide, since for these materials particularly high compatibility with the adhesives has been found.

In accordance with the invention it is possible outstandingly to use single-sidedly or double-sidedly coated papers of this kind. Since the interface between paper and coating, or the coating itself, represents the predetermined breakage area of the systems, it is advantageous to select a paper coated only on one side.

For the carrier material it is possible to use commercial coated papers whose coating can be split in the course of the splicing operation at the carrier surfaces provided with a second adhesive.

Alternatively, however, uncoated papers may first be provided with a coating, for use as carrier material for the adhesive tape of the invention, or a paper already provided with a coating is provided with a further surface coating, it being possible for the splitting during the splicing operation to take place in particular between the original—first—coat and the further surface coating.

Although the splitting—as set out above—occurs between the first coat and the carrier surface, it may be advantageous to increase the anchorage of the second layer of adhesive and the coat by further treatment of the coated surface, in particular by physical methods such as corona or plasma treatment or by chemical methods such as priming.

Also suitable as chemical substance for the surface coating, advantageously, moreover, are those chemical compositions of the kind described as laminating materials in specifications EP 1 076 026 A and EP 2 116 581 A, for example.

Such laminating compositions customarily comprise a binder and also additives which have a weak separation effect and, as and when required, elastifying qualities as well. Through the choice of the nature and amount of the binder it is possible to exert advantageous influence over the splitting properties (in particular, the tendency towards cohesive or adhesive fracture).

A first composition which can be employed outstandingly in accordance with the invention, as described by EP 1 076 026 A, comprises a binder and also silicone-free additives with a weak separation effect and, as and when required, elastifying additives as well. As binders it is possible for example to use modified starches, or binders of the kind that have long been used for wet-bonding adhesive tapes. Release agents used may be, for example, talc, stearyl derivatives such as Ca stearate, or dispersions of polymeric release agents, more particularly silicone-free and fluorine-free release agents, such as dispersions based on copolymers of stearyl methacrylate or stearyl derivatives of maleic acid with styrene, for example. Serving for example as elastifying agents, which may be added optionally, may be water-soluble polyglycols. In particular, aqueous preparations with 10 to 90 wt % of binder and 10 to 90 wt % of release agent, and also up to 60 wt % of elastifying agent, may be used as material for producing the surface coating. Preferred for use as binders are starch derivatives, an example being anionic potato starch, in fractions of 30 to 70 wt %. Release agents used are preferably talc, Ca stearate, and/or copolymers with stearyl groups that exhibit release activity, in fractions of 30 to 80 wt %. For elastification, polypropylene glycols or polyethylene glycols, especially water-soluble glycols of this class, have proven highly suitable, preferably in amounts between 0 to 15 wt %. Used primarily here are the higher molecular mass products that are solid at room temperature. Other elastifying agents that can be used to good effect in larger proportions are gum Arabic and plastics with a similar profile of properties. The material may also be admixed with fillers and/or thickeners, particularly in a fraction of up to 30 wt %.

A further composition which can be used outstandingly in accordance with the invention for producing the surface coating comprises at least one polysaccharide component and one surfactant component. Such compositions are described in EP 2 116 581 A and can be utilised effectively for the present invention as well. The composition used for the surface coating in that case is a material which comprises not only a binder, more particularly a polysaccharide component, but also at least one surfactant component, serving in particular as release agent. The surfactant component may be a single surfactant, although it is also possible to use a surfactant component made up of two or more surfactants. As and when required, the composition may advantageously include further components, such as elastifying additives (hereinafter also elastifying agents) in particular. The polysaccharide component in one very preferred procedure is starch, gum Arabic or derivatives of the aforementioned compounds. The binder component may also, moreover, be a stearate, for example, more particularly magnesium stearate and calcium stearate. The composition of the binder component may also be such that a mixture of starch with one or more further binders is used. Compositions particularly preferred in accordance with the invention have a polysaccharide fraction of up to 98 wt %, more preferably of up to 85 to 95 wt %, better still of 90 to 95 wt %. Starch derivatives can be used with particular preference, especially hydroxypropyl ethers based on potato starch. A starch of this kind is available, for example, from Emslandstärke under the name Emsol K55. The surfactant content is very preferably 2 to 20, better 5 to 15, ideally 5 to 10 wt %. The fraction figures above, both for the polysaccharide component and for the surfactant component, are based on the mixture of surfactant and polysaccharide, in each case in the form of the amount based on the solids fraction. Also present, moreover, is solvent, especially water, preferably in fractions of 50 to 80%. One particular procedure possible is to add the solid surfactant in a 20 to 40% strength aqueous solution to the polysaccharide component. As further additives it is possible here as well to make use, for example, of talc, Ca stearate and/or copolymers with release activity, having stearyl groups, in fractions of 30 to 80 wt %. For elastification, polypropylene glycols or polyethylene glycols, preferably in amounts between 0 to 15 wt %, have proven very suitable. Used primarily here are the higher molecular mass products that are solid at room temperature. Other elastifying agents which can be employed effectively in relatively large proportions are gum Arabic and plastics with a similar profile of properties. Depending on the composition used for the coating or for the other surface coating, the thickness thereof (the application weight) may vary. It has emerged as being advantageous if the areal weight of the surface coating is 1 to 25 g/m$^2$, based on the modified regions (meaning that for determining the areal weight, the only areas used are those which have actually been provided with a surface coating).

The adhesive tape of the invention, as already set out above, has at least two self-adhesive layers, these being a first layer (K1) of adhesive, which in the splicing operation is present on the facing side (K31) of the main carrier (K3) (and is therefore also referred to within this specification as "facing-side layer of adhesive"), and also at least one second layer (K2) of adhesive, which in the prepared roll and in the splicing operation is disposed on the reverse face (K32) of the main carrier (K3) (and which is therefore also referred to in the context of this specification as "reverse-face layer of adhesive").

Used very preferably for the first layer of adhesive and/or for the second layer of adhesive are self-adhesives. Self-adhesives—also referred to as PSAs for pressure sensitive adhesives—are considered in particular to encompass those polymeric compositions which—where appropriate through suitable additization with further components, such as tackifier resins, for example—are durably tacky and permanently adhesive at the application temperature (at room temperature unless otherwise defined) and adhere on contact, adhering more particularly immediately, to a multiplicity of surfaces, here in particular to the flat web materials (the adhesives exhibit "tack" [stickiness, or stickiness to the touch]). At just the application temperature, without activation by solvent or by heat, though usually under the influence of a greater or lesser pressure, they are capable of wetting an adherend substrate sufficiently that interactions sufficient for adhesion are able to develop between the composition and the substrate. Influencing parameters key to this ability include the pressure and the contact time. The special qualities of the PSAs derive in particular from, among others, their viscoelastic properties.

The adhesive used for the facing-side self-adhesive layer is selected preferably with a high tack (stickiness to the touch), whereas the reverse-face system advantageously uses a shear-resistant (self-)adhesive.

One very preferred embodiment of the invention uses acrylate-based systems as self-adhesives, in the form, for example, of straight acrylic adhesives (homopolymers and copolymers, based in each case exclusively on acrylate and/or methacrylate monomers; known as 100% systems), in the form of adhesives based on copolymers of acrylic monomers—acrylates, methacrylates—and non-acrylic monomers, or in the form of adhesives based on blends comprising at least two representatives from the list encompassing straight polyacrylates, copolymers of acrylic monomers and non-acrylic monomers, and (co)polymers only of non-acrylic monomers. It is possible with advantage to use both water-soluble and water-insoluble acrylates. Acrylates polymerised in water (waterborne systems) can also be used, with particular advantage.

It is also possible, moreover, to use natural and synthetic rubber adhesives, silicone-based adhesives, and dispersions of the above-described compounds.

Also highly useful are mixtures (blends) of different types of pressure sensitive adhesives, as for example blends of rubber-based adhesives (natural rubber and/or synthetic rubber) with acrylate adhesives, or blends of natural rubber with synthetic rubber. Blends of silicone systems with rubber systems (natural rubber and/or synthetic rubber) and/or acrylate systems can also be used.

It is noted that in principle all basic types of PSAs suitable for such adhesive bonds can be used. There is advantage in using repulpable adhesives, more particularly adhesives repulpable according to measurement method TAPPI UM 213 (TAPPI Useful Methods 213, TAPPI 1991, ISBN 0898522064), these being adhesives which on reprocessing of the flat web material, more particularly paper, can be incorporated largely or wholly into the pulp, in other words into the paper or fibre slurry in suspension or solution in water.

Adhesives which may also be used outstandingly for the purposes of the invention described here are described for example by the following specifications: EP 655 490 A, namely, in particular, repulpable PSAs based on polyacrylates comprising graft polymers; EP 1 489 153 A, namely, in particular, repulpable PSAs comprising polyacrylate-based block copolymers; EP 1 462 480 A, namely, in particular, acrylate-based PSAs combining high tack with high shear strength; EP 2 166 051 A and EP 1 935 956 A, namely, in particular, repulpable PSAs comprising additives—such as phosphates or orthophosphoric acid, for example—which are able to bind alkaline earth metal ions and which lead in particular to increased stability relative to calcium carbonate-containing papers; WO 03/20623 A, namely, in particular, PSAs with elevated shear strength, especially for operations with calenders; EP 2 062 952, namely, in particular, silicone-based PSAs; EP 1 903 084 A, namely, in particular, PSAs with additives for improved anchorage; WO 2007/96010 A, namely, in particular, self-adhesives which are particularly suitable on film substrates, and, in particular, synthetic rubber adhesives, but also the acrylate PSAs described therein; and DE 10 2013 226 504 A, namely shear-resistant PSAs with high tack based on acrylate.

The first, facing-side layer of adhesive may have been applied, in particular, over the full area, or else over part of the area (for example in segments, linear stripes, not linear—for instance undulatory—only in particular surface regions or the like). An adhesive applied substantially over the full area may have a spacing on one or both of the long edges, so that there (in each case) a stripe remains which is not provided with adhesive, in a width of in each case several millimetres, for example.

Provided on the first surface there may also be two or more—in each case coherent—first layers of adhesive, as for instance in the form of two or more—mutually unconnected—partial coverings, segments, linear or undulatory stripes or the like.

The function of the first layer(s) of adhesive is in particular, during the flying splice, to ensure the secure attachment of the new flat web to the outgoing, old flat web. Adhesives with a high tack are therefore used, in particular. Tack refers to the stickiness to the touch of an adhesive, in other words the quality thereof of bringing about immediate adhesion to a particular material.

Particularly for application in the paper industry or in the context of normal newspaper printing, high-tack adhesives are used advantageously on the facing side. It may, however, also be advantageous to use adhesives of high shear strength on the facing side. This is of interest in particular for application on the calender or in use on the dryer.

Provided on the second surface (K32) of the carrier layer (K3) (referred to as reverse face, owing to the positioning of the adhesive tape on application in the splicing operation) is at least one second layer (K2) of adhesive, which in turn may be provided over the full area or only in regions of the second (reverse-face) surface.

Figure 5:
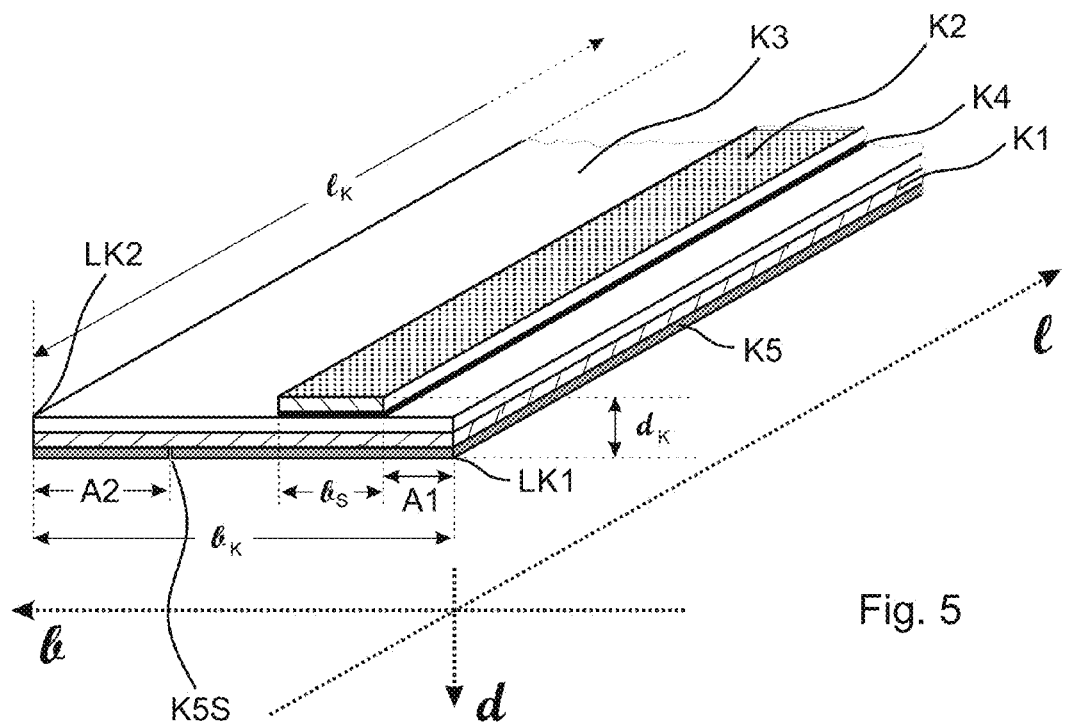
FIG. 5 is a perspective view of an exemplary adhesive tape according to the present invention.

In one very preferred embodiment the reverse-face layer (K2) of adhesive is applied in the form of a stripe (shown by way of example in FIG. 5), which in one advantageous refinement of the adhesive tape (K) extends parallel to one of its edges (LK1), in other words, in particular, linearly. Advantageously a strip of adhesive—more particularly a linear strip of adhesive—of this kind extends in the longitudinal direction ($l$) of the adhesive tape, in other words on one or parallel to one of the long edges (LK1) of the adhesive tape.

Adhesive tapes customarily have an extent in a first direction ($l$) which is very much greater than the extent in a second direction ($b$) defined at right angles thereto; this first direction is therefore referred to for the purposes of this specification as longitudinal direction ($l$), and the extent in this direction as length ($l_K$) of the adhesive tape. The second direction is referred to as cross direction ($b$), and the extent in this second direction as width ($b_K$) of the adhesive tape. The length ($l_K$) and the width ($b_K$) of the adhesive tape determine its areal extent.

The thickness ($d_K$) of the adhesive tape—the extent in the third direction ($d$) in the Cartesian coordinate system, defined at right angles to the first and to the second direction and therefore to the areal extent of the adhesive tape—is customarily in turn very much smaller than the width of the adhesive tape.

The adhesive tape of the invention may, however, also be present in the form of adhesive tape sections ("labels"), where the length and the width of the adhesive tape are of similar order of magnitude.

In one preferred embodiment the second (reverse-face) layer (K2) of adhesive applied in the form of a stripe is oriented parallel to its closest long edge (LK1) of the adhesive tape (K) and is indented at a distance (A1) from this long edge (LK1). The indentation amounts advantageously to up to 10 mm, preferably 0.5 to 5 mm, very preferably 1 to 3 mm. One specific embodiment of the adhesive tape of the invention has an indentation of 2 mm.

In another very preferred variant embodiment, the reverse-face layer (K2) of adhesive is provided in the form of a stripe which while running overall in the longitudinal direction ($l$) of the adhesive tape, does not itself have any linear edges. What this may look like, for instance, is that a linearly extending imaginary line can be defined in the longitudinal direction of the adhesive tape, running, in particular, parallel to at least one of the long edges (LK1) of the adhesive tape, with this line dividing the stripe of the layer of adhesive—when this stripe is looked at straight on—into two areal regions of equal size. In a preferred way the adhesive tape is formed conceptually by a sequence of adhesive tape sections for which in each case the corresponding section of adhesive located thereon is divided by the imaginary line into two parts of equal area.

A stripe of the invention with non-linear edges may be executed in such a way, for instance, that it has a left and a right boundary edge, at least one of these two edges being unstraight, such that the unstraight edge has projections which at their positions of maximum projection are continuously differentiatable and have a tangent running parallel to the imaginary line; more particularly, projections of a kind which are executed in rounded form at their points of maximum projection. Stripe forms of this kind are defined for example in EP 1 948 545 A. Explicit reference may be made to the line forms described in the claims of WO 2007/48695 A and EP 1 948 545 B and the line forms shown in the figures of those specifications—especially in FIGS. 1, 2, 3, 4, 5, 6 and 7 of WO 2007/48695 A—together with the associated disclosure; these line forms are also outstandingly realisable for the present invention. Especially advantageous are symmetrical wave forms in accordance with FIG. 7 of WO 2007/48695 A, and variants modified therefrom, for instance with a wavy edge and a straight edge, with wavy edges of different curvature, or with wavy edges whose maxima are displaced relative to one another. Hence it is possible, for example, also for edge shapes mirrored on the imaginary line to be realised.

A stripe of the invention with non-linear edges may also be executed such that at least its one boundary edge is designed in the form of a curve extending parallel to the imaginary line and is characterized by a sequence of rising and falling curve sections, so that a maximum or a plurality of maxima is or are formed between a respective rising curve section and a subsequent falling curve section in the curve region formed by these two curve sections, and so that a minimum or a plurality of minima is or are formed between a respective falling curve section and a subsequent rising curve section in the curve region formed by these two curve sections, the slope being different in magnitude in each rising curve section and in each falling curve section.

Curve profiles of this kind which are also advantageous for the present invention are shown for example by EP 2 130 887 A; explicit reference may be made to the line forms described in the claims and to the line forms shown in the figures of these specifications—particularly in FIGS. 2, 3, 3a, 4, 5, 6 and 7—including the associated disclosure.

Further edge forms for stripe edges which run non-linearly and which may be realised in the sense of the present invention are shown by EP 2 615 049 A; reference may be made in particular to the claims and to FIGS. 2, 3, 4, 5, 6, 7, 8, 9 and the associated explanations, with the geometries shown there being transferred to a stripe in accordance with the present invention.

Provided on the second (reverse-face) surface there may also be two or more—in each case coherent—first layers of adhesive, for instance in the form of two or more—mutually unconnected—partial coverings, segments, linear or non-linear—for instance undulatory—stripes or the like.

An embodiment of this kind has two, three or more stripes running parallel in the longitudinal direction of the adhesive tape, between which and the second surface of the carrier layer there is in each case a surface coating provided for the purpose of generating predetermined breakage areas. It is of advantage if the first of these stripes has a distance from its closest long edge of the adhesive tape, as elucidated above for the adhesive tape with one stripe, in particular also with the dimensions indicated there.

A system with two stripes may, for example, also have one stripe with at least one non-linear, more particularly undulatory edge—in particular, two non-linear, more particularly undulatory edges—as shown for instance in WO 2011/144466 A.

The extents of the reverse-face layers of adhesive are advantageously selected such that the desired splitting energy is obtained and that a secure adhesive bond is ensured. Through the form of the systems it is possible to influence the splitting behaviour. Relatively narrow predetermined breakage points—i.e. those which are small in relation to the width of the main carrier—offer the advantage that small fluctuations in the preselected parameters for the splitting operation are realisable.

Adhesive systems with a linear stripe form (those having two parallel edges in the longitudinal direction (*l*) of the adhesive tape) have, for example, in each case and independently of one another, widths ($b_S$) of 3 mm to 30 mm, particularly of 5 to 18 mm, very particularly of 15 mm and of 9 mm. Undulatory adhesive systems may for example have widths (the width of stripes ($b_S$) which do not run linearly is taken to be the maximum extent of the respective stripe in cross direction (*b*)) of 20, 30 or 40 mm. The aforesaid figures, however, do not in principle confine the widths, the choice of which is wide. If there is only one stripe-shaped reverse-face layer of adhesive present, it is likewise of advantage to select the aforementioned dimensions for said layer.

Through the choice of the width of the reverse-face layers of adhesive, more particularly in stripe form, it is possible to adjust the splitting energy which must be extended in order to split the predetermined breakage point completely, independently from the width of the main carrier. This is an advantage relative to the systems wherein the intended breakage area extends over the full area of the width of the main carrier.

In advantageous adaptation to the particular application, it is possible with preference likewise to use a variant of the adhesive tape of the invention wherein the only reverse-face layer of adhesive present in stripe form or—in the case of two or more stripes—the reverse-face layer of adhesive closest to the long edge borders that long edge directly, in other words not being indented.

Adhesive used for the second, reverse-face layer of adhesive is advantageously a shear-resistant adhesive.

A fundamental objective is to make the adhesive tape of the invention as thin as possible, and so the thickness of the second layer of adhesive is generally likewise selected to be as thin as possible. In another embodiment, however, it is also possible for the second (reverse-face) layer of adhesive to be replaced by a multi-layer system which comprises, in addition to the bottom layer of adhesive, a carrier (secondary carrier) and/or further layers. In that case, for example, the reverse-face self-adhesive system may be a double-sided self-adhesive tape, especially if it is likewise provided in stripe form.

Provided optionally on the second surface (reverse face) of the adhesive tape—especially in relation to specific applications of the adhesive splicing tape—may be third layers of adhesive, for example in the regions of the surface or parts of these regions in which no surface coating is provided. The design of this third layer of adhesive may for example be such that it is not detachable from the second surface of the carrier.

At least the areal regions of the second surface that are provided with the second layer of adhesive are modified with the surface coating. In this case the surface layer may be provided exclusively in the regions of the second surface of the carrier layer that are covered by the second layer of adhesive; alternatively, the surface coating may be present in areas in which there is no second layer of adhesive. Hence the surface coating, for example, may be present over the full area of the second surface of the carrier layer, as is the case, for example, in general for coated papers where the coat is applied as early as part of the papermaking process.

In a further preferred embodiment the first, facing-side self-adhesive layer (K1) is provided with a release liner (K5) which is optionally provided with a perforation or a slit (K5S) in the longitudinal direction ($l_K$).

Suitable for this purpose are the materials identified above. Very advantageously it is possible, for example, to use siliconized release paper. The slit (K5S) may be provided preferably at a distance (A2) of 10 to 40 mm from the long edge (LK2) of the adhesive tape (K), which is opposite the facing long edge (LK1) in whose vicinity the second layer (K2) of adhesive is arranged.

The second layer of adhesive may be provided over the full area or over part of the area on the reverse of the main carrier.

Advantageously an almost full-area implementation may be provided wherein stripes with which have no second adhesive and which are a few millimetres (for example in each case 1 or 2 mm) wide are provided on both long edges of the carrier.

In another very advantageous embodiment, the part of the reverse (K32) of the carrier (K3) that is furnished with one or more second layers (K2) of adhesive is up to 60% of the overall reverse-face area, preferably between 18 and 48%, it also being possible for the covered part of the reverse face to be divided into a plurality of areas, each of which is equipped with a second layer (K2) of adhesive.

The dimensions selected for the adhesive stripe of the invention may be different according to the field of use and the intended use and so may be adapted to the particular requirements. Advantageous product dimensions are, for example, stripes of 75 mm width, of 63 mm width, of 50 mm width and of 38 mm width, without wishing these figures to impose any restriction.

The adhesive tape of the invention may be provided with perforations or incisions such that individual pieces of defined, predetermined length can be taken off.

In one advantageous embodiment the adhesive tape is equipped with at least one means recognizable by machine (contactlessly) by means of a detector, through inductive detection, for example, the recognition being achieved preferably by metal, by transponder systems or by optical devices.

Such means recognizable optically or by machine may be provided in principle in one or more layers of the adhesive tape (carrier, layers of adhesive, other layers) by the admixing of appropriate additives into the material of the layer in question, and/or the means are provided as an independent layer or surface coating on existing layers in the adhesive tape assembly.

In one preferred variant, the carrier layer or regions thereof are composed of a material admixed with at least one detectable additive, and/or the carrier layer is an assembly which includes at least one layer of a detectable material.

In one embodiment of the inventive adhesive tape, for example, metal powders or granules are admixed to the actual carrier material, or the carrier framework is provided with one or more metal layers. In another variant of the inventive adhesive tape, the integrated signal function is realised by providing the carrier layer, advantageously over its full area, and in particular on its first surface, but optionally, instead or additionally, on its second surface, with an aluminium layer. Instead of aluminium, the layer used may also comprise all other materials detectable in accordance with the requirements, especially metals, for example copper, silver, gold.

Such layers are located advantageously on the facing side of the adhesive tape or the carrier layer.

Metal layers or metal coatings (of aluminium, for example) may also, instead of being present over the full area, be provided in the form of one or more stripes which extend in particular in the longitudinal direction of the adhesive tape of the invention. In principle such detectable layers may have any forms, such as segments, waves and the like, including irregular uninterrupted or interrupted forms.

In a further embodiment of the invention it is possible—alternatively or additionally to add mixtures in other layers, such as the carrier layer—with the first layer of adhesive and/or the second layer of adhesive and/or, optionally, further layers of adhesive present to have been admixed with corresponding detectable additives—metal powders or granules, for example.

In a further embodiment of the invention, the detection is brought about by transponder systems, more particularly by thin-film transponders, which are integrated into the adhesive tape. Here it is possible to realise versions with active and with passive transponders.

A feature of a further embodiment of the inventive adhesive tape is that the adhesive tape is provided with optically registerable means. These may be, for example, bar codes which can be read with a laser. When bar codes are used, in addition to the detection effect itself, information can be transmitted additionally, as for example details concerning the type or web thickness of the new roll. Thus when using rolls of different kinds or varieties, the processing unit can be set automatically to the new processing conditions, without further external control being required.

Functioning in a similar way are optical reflectors or diffraction gratings mounted in or on the carrier layer of the adhesive tape. These may likewise be detected optically and trigger the splicing operation.

A further example of optically detectable devices are particular colorations of the carrier layer and/or of the first layer of adhesive and/or of the second layer of adhesive and/or of functional layers and/or of any other layers present, which can likewise be registered by suitable detecting systems. Such colorations may be accomplished, for example, through the addition of black pigments.

Optically detectable devices may also be colour layers at any positions in the layer assembly of the adhesive tape, as for example on the top face of the carrier layer, by means of a black pigment line or black topcoat colour, for example. Colour layers of this kind may for example also be provided—alternatively or additionally—between the underside of the main carrier layer and the surface coating which effects the predetermined breakage point of the invention.

For the suitability of the adhesive tape of the invention in its intended use, the forces acting on the predetermined breakage area and required in order to initiate the splitting process in flying splice, and the force required to continue splitting of the predetermined breakage area, are of interest. These values ought to be set in such a way that initial splitting and continued splitting of the predetermined breakage point takes place only during use as intended, but then also does so reliably, without hindering the flying splice procedure. Advantageously here the splitting system ought to be set in such a way as on the one hand to prevent the risk of unwanted initial splitting in the acceleration phase, and on the other hand to ensure application-compatible splitting of the splicing tape without damage to the webs of material to be joined.

In order to overcome the splitting resistance of the facing edge, an increased maximum force is required for the initial splitting of the system (initial splitting force, force for initiating the splitting process of the predetermined breakage point). Furthermore, a force is required at a lower level for splitting over the entire width of the splicing tape (continued splitting force). The product of the force to be expended and the width of the splitting system is the energy that is needed for splitting (splitting energy).

The initial splitting force ought to be set at a high level such that the product does not open prematurely as a result of the aerodynamic forces and centrifugal forces acting during acceleration; on the other hand, the splitting energy must be low enough that the required energy for the complete splitting of the predetermined breakage area right through does not cause tearing. Values outstanding for these parameters can be realised by virtue of the configuration of the adhesive tapes of the invention.

To determine the initial splitting force (initial force for initiating the splitting process of the predetermined breakage point), swatch specimens are produced (for example in DIN A4 size) which comprise a carrier layer having a first surface and a second surface, there being provided on the side of the first surface of the carrier layer, indirectly or directly, over the full area, a first layer of adhesive (corresponding to the construction of the adhesive tape for which the initial splitting force is to be determined), and there being provided on the second surface of the carrier layer, in particular over the full area, a second layer of adhesive, the second surface of the carrier layer having been modified in accordance with the invention with a surface coating, and the mandates of the main claim having been observed. Where examining adhesive tapes for which the predetermined breakage areas in the longitudinal direction of the adhesive tape have interruptions (are segmented), swatch specimens with a second adhesive layer interrupted accordingly are produced.

One edge of the swatch specimen is then cut off to give a smooth cut edge. A piece of paper of high tensile strength is placed onto the second layer of adhesive of the specimen under test, and the free surface of adhesive is lined with a piece of siliconized paper. The high-tensile paper is gently pressed with the finger in order to prevent inclusions of air. Thereafter, a manual roller is run twice quickly over the assembly in order to achieve excellent bond strength. The bond should be produced such that the end of the high-tensile paper protrudes beyond the adhesive tape body at the smooth edge. Using a steel ruler, strips are cut out on the sides of the smooth edge of the assembly, the width of the strips (parallel to the smooth edge) being 15 mm and their length (at right angles to the smooth edge) being about 20 cm, with the protruding paper end located at one of their ends. This protruding paper end serves subsequently as a grip tab.

Figure 11:
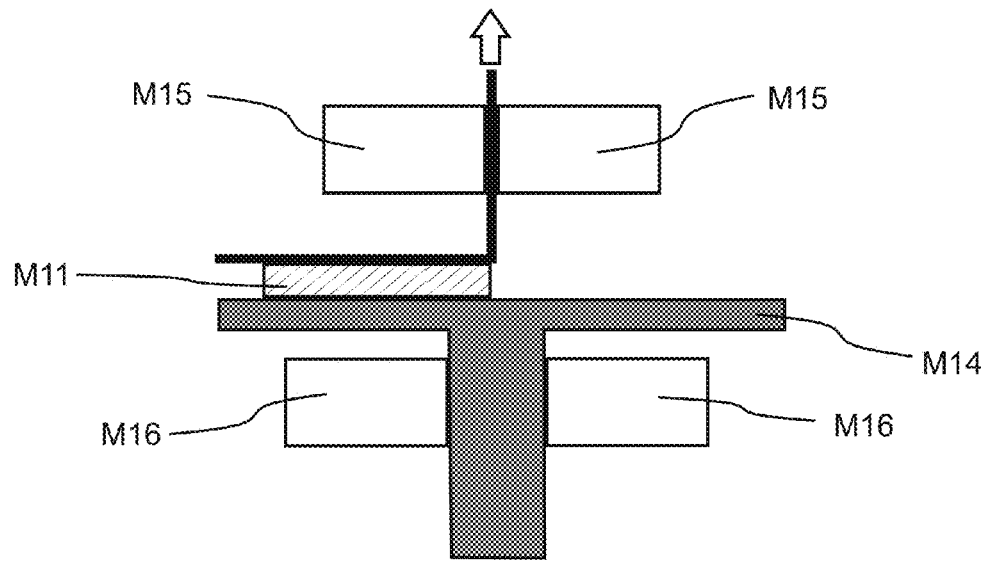
FIG. 11 is a cross-sectional view of an apparatus for measuring the initial splitting force.

The apparatus for measuring the initial splitting force is shown diagrammatically in FIG. 11. A sample M11 produced as described above is clamped into a tensile testing machine, the siliconized paper on the facing-side layer of adhesive is removed, and the sample is adhered firmly, with its now-exposed surface horizontal, on a carrier M14 which is clamped into the tensile machine (by means of clamping apparatus M16) (the carrier being at the bottom in the figure). The grip tab of the paper M12 on the reverse-face layer of adhesive is clamped into the tension unit (by means of clamping device M15) of the tensile testing machine. It should be ensured that the predetermined breakage point has not yet begun to split before measurement is commenced. The grip tab of the paper M12 applied on the reverse-face layer of adhesive is then pulled at a speed of 300 m/min such that the sample splits at an angle of 90°. This splitting takes place in the predetermined breakage point. The initial force here is recorded (and corresponds to the maximum of the force-travel curve); the value measured is standardized, in knowledge of the actual specimen width, to 1 cm sample width. The average value from three measurements is reported (in N/cm).

For determining the continued splitting force, corresponding sample strips are produced, with the only difference that high-tensile papers with grip tabs are provided both on the surface of the first adhesive and on the surface of the second adhesive (on the lower surface instead of the siliconized paper).

Figure 12:
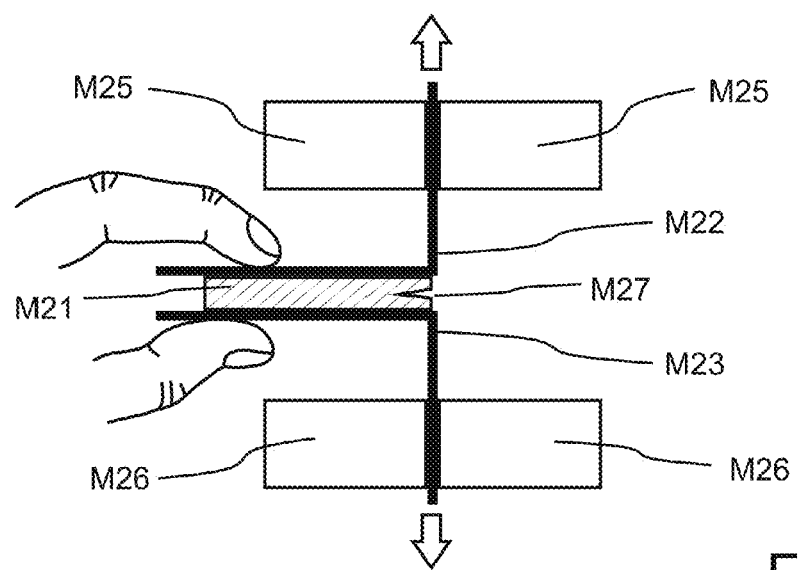
FIG. 12 is a schematic showing measurement of the continued splitting force.

For the measurement of the continued splitting force—in this regard, see FIG. 12—the sample M21 thus prepared is first of all initially split by hand at one of the narrow edges (indicated by the split M27 in FIG. 12). The sample M21 is then clamped, at both grip tabs of the lining papers M22 and M23, into the clamping devices M25, M26 of a tensile testing machine, and fixed (by holding with the fingers, for example) in such a way that it stands perpendicularly to the two tensioning directions and that the splitting process continues at the split 27 when the tensile testing machine is put into operation. Pulling is carried out equally on both grip tabs, to continue sample splitting with a speed of 300 mm/min at an angle of 180°. The splitting here takes place in the predetermined breakage point. The force reported is the force, standardized to 1 cm specimen width, which is needed in order to continue the splitting process (reported in cN/cm).

The test conditions for all measurements are as follows: temperature 23±1° C.; 50±5% relative humidity, air pressure 1013±5 mbar.

In one preferred embodiment of the invention, the initial splitting force required for splitting of the predetermined breakage point of the adhesive tape of the invention is in the range from 0.1 N/cm up to 2.0 N/cm (newtons per centimetre bond width), and the force required to split the predetermined breakage area (continued splitting force) is between 5 and 50 cN/cm.

The invention further relates to a splicing method for the on-the-fly roll changeover of flat web material wound up into rolls, more particularly as already set out briefly above. The method of the invention is shown by way of example in FIGS. 6 to 10. Adhesive tapes which can be used in accordance with the invention are shown by way of example by FIGS. 1 to 5.

In a method preferred in accordance with the invention, for preparation, the flat web section (R1) forming the uppermost turn of a roll (R) of a new flat web (RB) is fastened to the flat web section (R2) forming the underlying turn, with an adhesive tape (K) which comprises a carrier (K3) having a first (K31) and a second (K32) surface, a first layer (K1) of adhesive—more particularly layer of self-adhesive—, which is provided directly or indirectly on the first surface (K31) of the carrier (K3), and a second layer (K2) of adhesive—more particularly layer of self-adhesive—, which is provided over at least part of the area on the second surface (K32) of the carrier (K3). This is done preferably in a way as set out at the outset, so that an areal region (K12), required for the splicing method, of the facing-side, first layer (K1) of adhesive lies exposed (cf. FIG. 7). Thereupon the new roll (R) thus furnished is placed adjacent to an almost entirely unwound old roll requiring replacement (not shown), and is accelerated to substantially the same peripheral speed as that roll (cf. FIG. 8). The roll (R) is then pressed against the outgoing old web (B) of the old roll, with the exposed areal region of the facing-side layer (K12) of adhesive of the adhesive tape adhering to the old web (B) with the webs at substantially the same speeds.

In order to increase the reliability of bonding, it is advantageous to carry out counter-pressing from the reverse face of the web, during the bonding operation, with a pressing means (roll, brush or the like) (A). In this method an adhesive tape (K) is used that has regions suitable for areal splitting ("predetermined breakage areas"), by at least a part-region of the second surface of the carrier layer (K3) being modified with a surface coating (K4), the forces of adhesion of the lower layer (K2) of adhesive to the surface coating (K4) being greater than the forces of adhesion of the surface coating (K4) to the carrier layer (K3) and/or than the forces of cohesion within the surface coating (K4). Employed here in particular is an adhesive tape of the invention as described more closely in this specification and in the claims. At the same time as or immediately after adhesive bonding, there is adhesive fracture, at least in the predetermined breakage areas, between the surface coating (K4) and the carrier layer (K3) of the adhesive tape (K), or there is cohesive fracture within the surface coating (K4), and so, after the adhesive fracture or cohesive fracture, at least a part-layer of the surface coating (K4) masks the second layer (K2) of adhesive bonded on the old web (B), and there are no adhesive regions lying exposed there.

In an onward development of the inventive method, the adhesive tape (K) is bonded at right angles to the running flat web (RB). In one advantageous variant of the inventive method, the bonding of the adhesive tape (K) may also take place at an acute angle of up to 30° to the running flat web, more particularly of up to 5°.

In the splicing method, an adhesive tape (K) is bonded in a straight line below the uppermost turn (R1) of the new flat web (RB) to a new flat web roll (R). The bonding here is such that a part of the adhesive tape (K12) remains free for bonding with the outgoing web (B).

The adhesive tape (K) is preferably bonded in a straight line below the uppermost turn (R1) of the flat web (RB) of the new roll (R), so that a part (K12) of the adhesive tape (K) remains free, while the reverse-face layer(s) (R2) of adhesive of the adhesive tape (K) bond to the underlying flat web turn (R2) and so secure the uppermost web turn (R1); optionally, first of all, only part (K51) of the liner (K5) optionally located on the first, facing-side layer (K1) of adhesive has been removed, and so the part (K12) of the layer (K1) of adhesive that is required for the splicing method is still lined with the liner (K52), and the roll (R) in this state has no free adhesive area; then, for the subsequent preparation of the splicing method, any residual liner (K52) still present is removed, after which the new roll (R) thus equipped is placed adjacent to an almost completely unwound old roll requiring replacement (not shown) and is accelerated to substantially the same peripheral speed as that roll, then pressed against the outgoing old web (B) of the old roll, with the exposed region (K12) of the facing-side layer (K1) of adhesive of the adhesive tape (K) bonding to the old web (B) with the webs at substantially the same speeds, while at the same time or immediately thereafter the adhesive tape (K) splits essentially in the region in which it is equipped with the second, reverse-face layer (K2) of adhesive (or the second, reverse-face layers of adhesive) and non-adhesively masks the reverse-face layer or layers (K2) of adhesive with the surface coating (K4) detached from the carrier layer (K3) in this region, and/or with a part-layer of the surface coating (K4) split cohesively in this region.

In a further variant, an adhesive tape of the invention is used in splicing methods for which the preparation of the new roll is accomplished not by bonding the adhesive tape below the web end of the new web, but instead by bonding it above. Adhesive tape versions and methods of this kind are described for example in specifications EP 970 905 A or WO 2003/024850 A; the splicing methods depicted therein can be outstandingly carried out likewise with corresponding adhesive tape versions with predetermined breakage points configured in accordance with the invention, and are intended to be encompassed by the invention.

Unexpectedly, the adhesive tape of the invention is outstandingly suitable for flying splice. Very advantageously, with the adhesive tape of the invention, the thickness of the bond site on transition from the old roll to the new roll can be greatly reduced, and so the problems described at the outset do not occur, or only to a very much reduced extent.

The invention claimed is:

1. An adhesive tape suitable for on-the-fly roll changeover of flat web material wound up into rolls,
    comprising a carrier layer having a first surface and a second surface,
    there being provided on the side of the first surface of the carrier layer, indirectly or directly, over at least part of the area, a first layer of adhesive,
    and the second surface of the carrier layer having one or more areas on which a second layer of adhesive is provided,
    wherein
    the adhesive tape has regions ("predetermined breakage areas") suitable for areal splitting,
    by at least those areal regions of the second surface of the carrier layer on which the second layer of adhesive is provided having been modified with a surface coating,
    the surface coating is present over an area less than the entirety of the second surface,
    the second layer of adhesive is provided in the form of one or more uninterrupted stripes on the second surface of the carrier layer,
    the surface coating is provided exclusively in the regions of the second surface of the carrier layer that are covered by the stripe of adhesive, and
    the forces of adhesion of the lower layer of adhesive to the surface coating being greater than the forces of adhesion of the surface coating to the carrier layer,
    and/or the forces of adhesion of the lower layer of adhesive to the surface coating being greater than the forces of cohesion within the surface coating.

2. Adhesive tape according to claim 1, wherein
    the carrier layer is a paper layer, where a layer of a chemical substance has been applied to the surface for the surface coating.

3. Adhesive tape according to claim 2, wherein
    the chemical substance is or comprises a chemical composition whose principal constituent is one or more minerals, one or more protein derivatives, one or more polysaccharides, one or more plastics particles, or a mixture of two or more representatives of the aforesaid substances.

4. Adhesive tape according to claim 3, wherein the mineral used comprises kaolin.

5. Adhesive tape according to claim 3, wherein
    the surface coating is obtainable by applying and drying a suspension or solution of the minerals, protein derivatives, polysaccharides and/or by applying a melt of the plastics.

6. Adhesive tape according to claim 2, wherein substances used as a constituent of the chemical substance are, exclusively or in part, substances whose structure is leafletted, layered, or both leafletted and layered.

7. Adhesive tape according to claim 1, wherein
    the areal weight of the surface coating is 1 to 25 $g/m^2$, based on the modified regions.

8. Adhesive tape according to claim 1, wherein the first layer of adhesive is a layer of self-adhesive and/or in that the second layer of adhesive is a layer of self-adhesive.

9. Adhesive tape according to claim 1, wherein
    the first layer of adhesive is lined with a release material.

10. Adhesive tape according to claim 9, wherein
    the release material is provided with a slit or a perforation.

11. Method for joining together two flat webs during on-the-fly roll changeover of flat web materials wound up into rolls ("splicing method"),
    a) fastening a flat web section forming a topmost turn of a new roll to a flat web section forming an underlying turn of the new roll with an adhesive tape according to claim 1,
        such that an areal region, needed for the splicing method, of the first layer of adhesive lies exposed,
    b) placing the new roll thus equipped adjacent to an almost fully unwound old roll requiring replacement, and accelerating the new roll to substantially the same peripheral speed as said old roll, then pressing the new roll against the old roll, the exposed areal region of the layer of adhesive of the adhesive tape bonding to the old roll at substantially identical web speeds, and
    c) at the same time as or immediately after the bonding, at least in the predetermined breakage areas, adhesive fracture occurring between the surface coating and the carrier layer of the adhesive tape, or cohesive fracture occurring within the surface coating, so that after the adhesive or cohesive fracture, at least a part-layer of the surface coating masks the adhesive tape bonded on the old roll, and no adhesive regions lie exposed there.

12. Adhesive tape according to claim 1, wherein the forces of adhesion of the lower layer of adhesive to the surface coating are greater than the forces of adhesion of the surface coating to the carrier layer so that forces produced on the adhesive tape during a flying splice cause the surface coating to detach from the carrier layer.

13. Adhesive tape according to claim 1, wherein the surface coating comprises at least first and second functional layers so that force produced on the adhesive tape during a flying splice causes the first functional layer to separate from the second functional layer.

* * * * *